United States Patent [19]
Freytag et al.

[11] 3,978,242
[45] Aug. 31, 1976

[54] CHEESE FLAVOR
[75] Inventors: Wolfram Gustav Freytag, Halstenbek; Karl Heinz Ney, Hamburg; I. Poetoe Gde Wirotama, Rellingen, all of Germany
[73] Assignee: Lever Brothers Company, New York, N.Y.
[22] Filed: Mar. 26, 1975
[21] Appl. No.: 562,319

Related U.S. Application Data
[63] Continuation of Ser. No. 417,863, Nov. 21, 1973, abandoned.

[30] Foreign Application Priority Data
Nov. 22, 1972 Luxemburg.............................. 66516

[52] U.S. Cl................................ 426/537; 426/534; 426/538
[51] Int. Cl.² ........................................ A23C 1/226
[58] Field of Search ............................. 426/534–538

[56] References Cited
UNITED STATES PATENTS
3,520,699   8/1970   Henning.............................. 426/538

OTHER PUBLICATIONS
Fenaroli's Handbook of Flavor Ingredients, 1971, Edited by Furia et al., Chemical Rubber Co., Cleveland, pp. 741–742.
Day et al., Gas Chromotographic & Mass Spectral Identification & Natural Components of the Aroma Fraction of Blue Cheese, J. Agr. Food Chem., 13, 1965, (Jan.–Feb.), pp. 2–4.

*Primary Examiner*—Joseph M. Golian
*Attorney, Agent, or Firm*—Lever Brothers Company

[57] ABSTRACT
An Italico-cheese flavor is given to a foodstuff by the addition of a flavor composition comprising 2-phenyl ethanol and methyl-1-butanols. Addition of the flavor composition is particularly useful when the foodstuff is young Cheddar cheese.

7 Claims, No Drawings

CHEESE FLAVOR

This is a continuation of application Ser. No. 417,863, filed Nov. 21, 1973, and now abandoned.

The invention relates to a process for imparting a cheese flavour, particularly an Italico-cheese flavour to a foodstuff. The invention also relates to the flavour composition suitable to be used in this process.

BACKGROUND OF THE INVENTION

According to the invention, by Italico-cheese is understood a butter cheese which is made in Italy from cow's milk. It is a quickly ripening soft cheese with a limited shelf-life.

Italico-cheese is particularly appreciated on account of its mild pure flavour, which does not resemble that of the so-called Limburg cheese and is not sourish either, but rather fatty-melting with a spicy note, and because of its consistency. When sliced, Italico-cheese shows a silky lustre, and on the inside it is elastical and soft, does not swell on the cutting surface and is yellow like butter.

Up to now no attempts have become known to develop seasoning mixtures for flavouring foodstuffs with a flavour resembling that of well-tasting Italico-cheese.

It has been tried to trace individual components typical for the Italico-cheese flavour. The occurrence of free monocarboxylic acids in Italic-cheese is known e.g. from work by F. Albonico, G. Kaderavek and G. Volentario in Riv. d. Latte 20, 1 (1964). In Industrie Agrarie, 2, 42 (1971) P. Spettoli has reported on the occurrence of amines in Italico-cheese.

It has appeared, however, that it is not possible to impart an Italico-like flavour to foodstuffs by merely incorporating therein carboxylic acids and amines.

It has now surprisingly been found that the typical Italico-cheese flavour is essentially obtained by the addition of 2-phenyl ethanol to young cheese, e.g. young Cheddar.

It was further found that the typical Italico-cheese flavour is supported by the presence of methyl-1-butanols, by which according to the present invention should be understood 2-methyl-1-butanol, 3-methyl-1-butanol and a mixture of these two compounds. Other taste-activating flavour components can additionally be incorporated into the foodstuffs, but only in such amounts that they cannot dominate the taste. Thus it was found that the Italico-cheese flavour of a foodstuff can be rounded off by the additional incorporation of flavour additives known for cheese, such as fatty acids, further alcohols and amines.

Up to now, phenyl ethanol and methyl-1-butanols have remained unknown in connection with Italico-cheese. Indeed, their occurrence in other cheese flavours, viz. in blue cheese flavour, has been established, cf. E. A. Day and D. F. Anderson in J. of Agricultural and Food Chemistry, Vol. 13, No. 1, Jan/Feb. 1965. The fact that these components occur besides a large number and amount of other taste-determining flavour components makes it clear that they are not determining for the taste in this case, that is to say that for the blue cheese flavour their presence is only of minor importance.

SUMMARY OF THE INVENTION

The invention therefore provides a process for imparting an Italico-cheese flavour to a foodstruff comprising adding to the foodstuff an effective amount of a cheese flavour composition comprising 2-phenyl ethanol.

The process of the invention is useful to impart to foodstuffs, preferably cheese products, in particular processed cheese manufactured from young relatively tasteless raw cheese, e.g. young Cheddar cheese, a flavour and taste resembling ripened Italico-cheese. The process is preferably carried out by adding such an amount of 2-phenyl ethanol to the foodstuff as to give 0.3 to 10 mg/kg, more preferably 1 to 5 mg/kg of 2-phenyl ethanol in the flavoured foodstuff. In a preferred embodiment of the process of the invention the cheese flavour composition to be used in that process also comprises methyl-1-butanols.

The presence of methyl-1-butanols has been found to enhance the degree to which the product flavoured according to the invention resembles the natural Italico-cheese.

Suitable amounts of methyl-1-butanols to be used in the process are preferably such which will give 3 to 40 mg/kg, more preferably 6 to 12 mg/kg of methyl-1-butanols in the flavoured foodstuff.

A particularly characteristic Italico-cheese flavour can be obtained if the ratio by weight of 2-phenyl ethanol to methyl-1-butanols in the composition is in the range of 1 : 3 to 1 : 4.

As stated above, the Italico flavour of a foodstuff can be further rounded off by the incorporation in the flavour composition of suitable amounts of known cheese flavour components, such as fatty acids, further alcohols and amines. As fatty acids can be used straight-chain and branched-chain alkanoic acids having 3 to 6 carbon atoms, for instance propionic acid, butyric acid, iso-butyric acid, 3-methyl butanoic acid and hexanoic acid. Suitable amounts are for butyric acid 5 to 300 mg/kg, preferably 25 to 100 mg/kg, for iso-butyric acid 1 to 100 mg/kg, preferably 4 to 10 mg/kg, and for 3-methyl butanoic acid 1 to 100 mg/kg, preferably 3 to 30 mg/kg.

In addition to the branched methyl-1-butanols mentioned a suitable amount of further alcohols of one or more from the group consisting of isobutanol as well as straight-chain 1-alkanols having 4 to 6 carbon atoms and 2-alkanols having 5 to 9 carbon atoms can be incorporated into the foodstuff. Suitable amounts for isobutanol and/or the total straight-chain $C_4$–$C_6$ 1-alkanols are 1 to 10 mg/kg, preferably 3 to 5 mg/kg, and for the total $C_5C_9$ 2-alkanols 0.2 to 5 mg/kg, preferably 0.5 to 2 mg/kg. The 2-alkanols may be present as racemates.

The amines used can be one or more from the group consisting of alkylamines, dialkylamines and trialkylamines having 1 or 2 carbon atoms in the alkyl group and/or at least one of the amines pyrrolidine and piperidine. Suitable amounts of total alkylamines, dialkylamines and trialkylamines having 1 or 2 carbon atoms in the alkyl group are 0.5 to 10 mg/kg, preferably 1 to 3 mg/kg, and for pyrrolidine and/or piperidine 0.1 to 10 mg/kg, preferably 0.5 to 0.7 mg/kg. Further compounds that are well-known flavour ingredients, such as diacetyl, acetaldehyde as well as ethyl esters of fatty acids having 4 to 6 carbon atoms, can also be used for rounding off an Italico-flavour, so long as they are added in such amounts that they do not dominate the taste.

The invention also provides an Italico-cheese flavour composition comprising 2-phenyl ethanol and methyl-1-butanols. Particularly useful flavour compositions according to the invention comprise 1–35 parts by weight of 2-phenyl ethanol and 10 to 140 parts by weight of methyl-1-butanols.

A preferred flavour composition comprises 1–5 parts by weight of 2-phenyl-ethanol and 6 to 12 parts by weight of methyl-1-butanols.

The cheese-flavour compositions according to the invention and to be used in the process thereof are synthetic compositions i.e. the compositions are obtained by other means than by some treatment of some cheese in which the component or components of the composition according to the invention may happen to occur.

2-Phenyl ethanol and methyl-1-butanols are components which can be prepared by methods well-known to the skilled chemist.

Even very low concentrations of the active components in the flavour composition to be used in the process of the invention yield good results. E.g. flavour compositions containing as little as 0.1 or even 0.01% by weight of 2-phenyl ethanol have been found to be suitable.

Similarly, benificial results of the addition of methyl-1-butanol to the flavour composition have been noted at concentrations as low as 0.6 or even 0.3% by weight of the composition.

A suitable Italico-cheese flavour composition can be prepared from 0.3 to 10 parts 2-phenyl ethanol
3 to 40 parts methyl-1-butanols
and optionally
10 to 600 parts alkanoic acids having 3 to 6 carbon atoms, of which preferably
  5 to 300 parts butyric acid,
  1 to 100 parts iso-butyric acid and
  1 to 100 parts 3-methyl butanoic acid
1 to 10 parts isobutanol and/or straight-chain 1-alkanols having 4 to 6 carbon atoms
0.2 to 5 parts 2-alkanols having 5 to 9 carbon atoms
0.5 to 10 parts alkylamines, dialkylamines and trialkylamines having 1 or 2 carbon atoms in the alkyl group
0.1 to 10 parts pyrrolidine and/or piperidine.

A preferred Italico-cheese flavour composition can be prepared from
1 to 5 parts 2-phenyl ethanol
6 to 12 parts methyl-1-butanols
25 to 100 parts butyric acid
4 to 10 parts iso-butyric acid
3 to 30 parts 3-methyl butanoic acid
3 to 60 parts other alkanoic acids having 3 to 6 carbon atoms
3 to 5 parts isobutanol and/or straight-chain 1-alkanols having 4 to 6 carbon atoms
0.5 to 2 parts 2-alkanols having 5 to 9 carbon atoms
1 to 3 parts alkylamines, dialkylamines and trialkylamines having 1 or 2 carbon atoms in the alkyl group
0.5 to 0.7 parts pyrrolidine and/or piperidine.

The parts and percentages given in this specification are by weight, unless stated otherwise. The invention will now be further illustrated by the following examples, without being limited thereto.

EXAMPLE I

A processed cheese was prepared from 1 kg abt. 3 week-old Cheddar, 600 g water and 30 g melting salt, consisting of a commercial mixture of polyphosphate, with stirring and heating. To the melt, while still hot, 3 mg, i.e. about 2 mg/kg 2-phenyl ethanol were added with stirring.

A processed cheese was obtained having a flavour resembling Italico-cheese.

EXAMPLE II

A. Of a mixture of 3 parts 2-phenyl ethanol, 11 parts 3-methyl-1-butanol and 1 part 2-methyl-1-butanol, 15 mg were dissolved in one liter water with stirring. The solution thus formed possessed the characteristic flavour of an Italico-cheese.

B. A processed cheese was prepared from 1 kg abt. 3 week-old Cheddar, 600 water and 30 g melting salt, consisting of a commercial mixture of polyphosphate, with stirring and heating. To the melt, which had not yet completely cooled down, 15 mg/kg of the mixture of alcohols described sub A were added with stirring. A processed cheese was obtained which had a characteristic Italico taste.

EXAMPLE III

The procedure of Example I was repeated, except that 150 mg, that is about 90 mg/kg, of the following cheese flavour composition were added:

| | |
|---|---|
| 3 parts 2-phenyl ethanol | 6 parts butyric acid |
| 11 parts 3-methyl-1-butanol | 4 parts iso-butyric acid |
| 1 part 2-methyl-1-butanol | 25 parts 3-methyl butanoic acid. |

A processed cheese was obtained having a good Italico taste.

EXAMPLE IV

The procedure of Example II B was repeated, except that 100 mg, i.e. about 60 mg/kg, of the following seasoning mixture were added:

| | Parts |
|---|---|
| 2-phenyl ethanol | 3.3 |
| 3-methyl-1-butanol | 11.0 |
| 2-methyl-1-butanol | 1.0 |
| butanol | 0.3 |
| isobutanol | 3.0 |
| hexanol | 0.7 |
| 2-pentanol | 0.3 |
| 2-heptanol | 0.2 |
| 2-nonanol | 0.2 |
| propionic acid | 2.0 |
| iso-butyric acid | 9.0 |
| butyric acid | 50.0 |
| 3-methyl butanoic acid | 14.0 |
| caproic acid | 8.0 |
| piperidine | 0.3 |
| pyrrolidine | 0.3 |
| triethyl amine | 0.05 |
| dimethyl amine | 1.3 |
| trimethyl amine | 2.0 |
| water | 13.45 |

A processed cheese was obtained which as to taste entirely resembled a processed cheese made from Italico.

We claim:
1. Process for imparting an Italico-cheese flavour to a foodstuff in which:
  a. a cheese flavouring composition is prepared by admixing of components selected from the group consisting essentially of:
    i. from 0.3 to 10 parts by weight of 2-phenyl ethanol;

ii. from 3 to 40 parts by weight of methyl-1-butanols selected from the group consisting of 2-methyl-1-butanol,3-methyl-1 butanol and mixtures thereof;
iii. from 0 to 600 parts by weight of alkanoic acids having 3 to 6 carbon atoms;
iv. from 0 to 10 parts by weight of isobutanol and/or straight-chain 1-alkanols having 4 to 6 carbon atoms;
v. from 0 to 5 parts by weight of 2-alkanols having 5 to 9 carbon atoms;
vi. from 0 to 10 parts by weight of alkylamines, dialkylamines and trialkylamines having 1 to 2 carbon atoms in the alkyl group;
vii. from 0 to 10 parts by weight of pyrrolidine and/or piperidine; and,
b. admixing the mixture obtained by step (a) with said foodstuff in an amount to give 0.3 to 10 mg/kg 2-phenyl ethanol and 3 to 40 mg/kg of methyl-1-butanols in the flavoured foodstuff.

2. Process according to claim 1, in which the amounts of 2-phenyl ethanol and ethyl-1-butanols are such as to give 1 to 5 mg/kg of 2-phenyl ethanol and 6 to 12 mg/kg of methyl-1-butanol in the flavoured foodstuff.

3. Process according to claim 1, in which the ratio by weight of 2-phenyl ethanol to methyl-1-butanols in the flavour composition is in the range of 1:3 to 1:4.

4. Process according to claim 1, in which the foodstuff is a cheese product.

5. Foodstuff having an Italico-cheese flavour and prepared by a process according to claim 1.

6. Italico-cheese flavouring composition prepared by admixing of components selected from the group consisting essentially of:
i. from 0.3 to 10 parts by weight of 2-phenyl ethanol;
ii. from 3 to 40 parts by weight of methyl-1-butanols selected from the group consisting of 2-methyl-1-butanol, 3-methyl-1-butanol and mixtures thereof;
iii. from 0 to 10 parts by weight of pyrrolidone and/or piperidine.

7. Italico-cheese flavouring composition according to claim 6, comprising 1 to 5 parts by weight of 2-phenyl ethanol and 6 to 12 parts by weight of methyl-1-butanols.

* * * * *